July 17, 1923.
J. L. STOLTZ
1,462,128
VEHICLE WHEEL
Original Filed Jan. 12, 1922
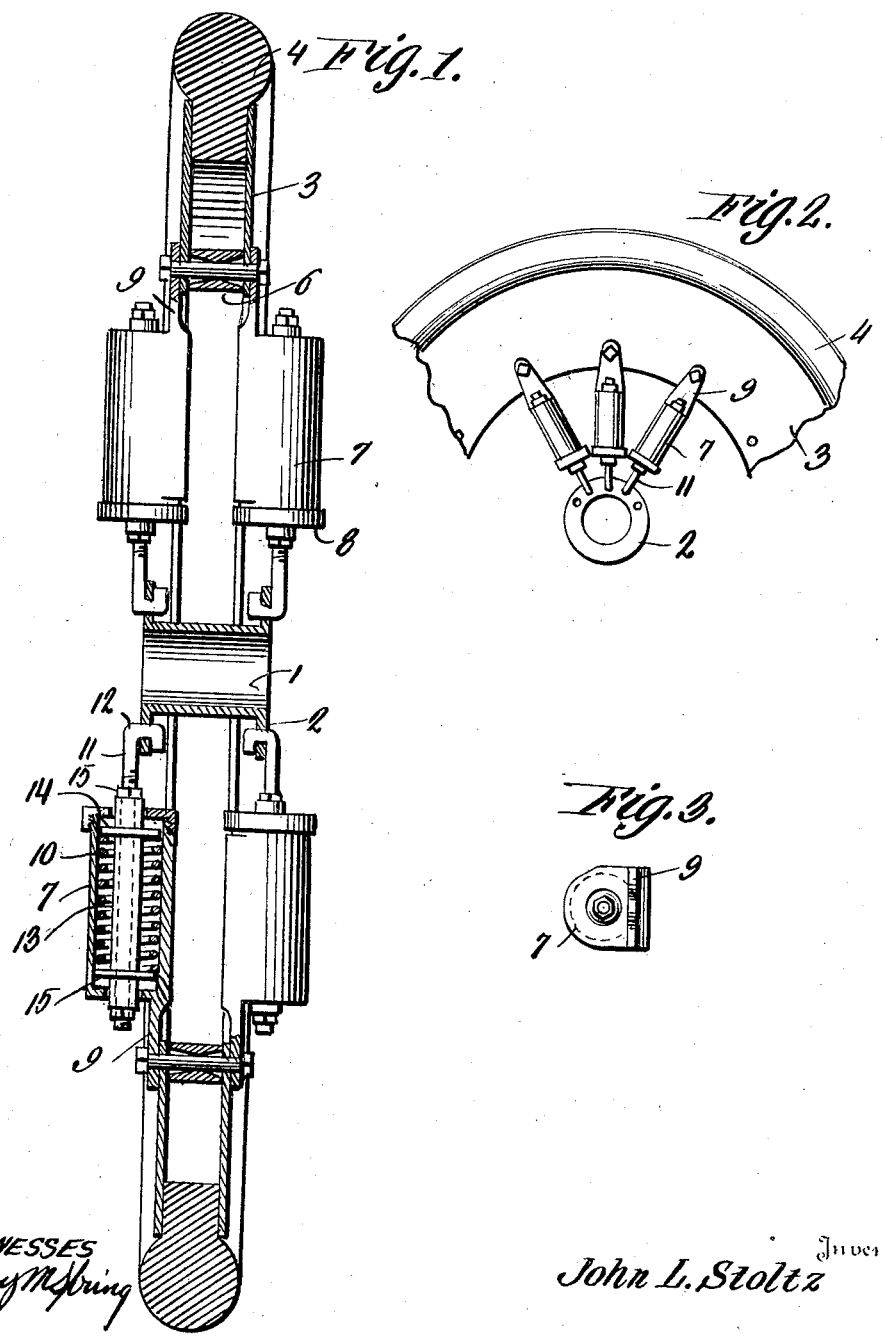
Inventor
John L. Stoltz
By Richard B. Owen
Attorney
WITNESSES Patented July 17, 1923.

1,462,128

UNITED STATES PATENT OFFICE.

JOHN L. STOLTZ, OF SUMNER, ILLINOIS.

VEHICLE WHEEL.

Application filed January 12, 1922, Serial No.528,705. Renewed January 30, 1923.

*To all whom it may concern:*

Be it known that I, JOHN L. STOLTZ, a citizen of the United States, residing at Sumner, in the county of Lawrence and State of Illinois, have invented certain new and useful Improvements in Vehicle Wheels, of which the following is a specification.

This invention relates to vehicle wheels of the class in which the rim of the wheel is connected to the hub by resilient spokes whereby they may be extended or contracted in such manner as to provide a cushioning effect to absorb shocks and jars and thus render the wheel useful in displacing wheels adapted to be used with pneumatic tires.

With the above and numerous other objects in view, the invention resides in certain novel features of construction, and the combination and arrangement of parts as will be hereinafter more fully described and claimed.

In the drawing:—

Figure 1 is a vertical section taken through the wheel,

Figure 2 is a fragmentary side elevation thereof, and

Figure 3 is an end view of a cylinder forming part of one of the spokes.

Referring to the drawing in detail it will be seen that the hub 1 is provided with the annular flanges 2 at its ends, each of which is provided with a series of apertures for receiving spoke elements to be hereinafter described in detail. The felly of the wheel is formed by a pair of spaced circular plates 3 which receive the tire or tread element 4 therebetween. This tire is preferably formed of solid rubber and may be of any preferred construction. The plates 3 are provided with a series of annular arranged apertures that register with each other for receiving the bolts 5 which pass through the spacing washers 6.

The spoke elements consist of the cylinders 7 which have their inner ends closed by the apertured caps 8 while their other ends are permanently or integrally provided with an apertured closure. The outer ends are provided with the extensions 9 having apertures therein so as to be pivotally connected to the bolts 5. A spring 10 is mounted in each cylinder 7 and a spoke rod 11 passes therethrough having its inner end hooked as at 12 for engaging the apertures in the flanges 2. A sleeve 13 is mounted on the shank of the rod 11 which is threaded and is held in place by the washers 14 and nuts 15. The washers 14 are slidable over the sleeve but not over the nuts 15 and thus the spring may be compressed from either side as will be readily understood from a consideration of Figure 1. The spacing element 6 is preferably provided with a bore having its mid portions smaller than its end portions.

It will thus be seen that any jars or shocks which are rendered to the tread element 4 during the rotation of the wheel will be delivered through the felly 3 to the spokes including the cylinders and rods with their resilient connections, thereby preventing these shocks from being conveyed in an unpleasant manner to the vehicle.

Having thus described my invention what I claim as new is:—

1. In combination, a hub, a felly, a plurality of cylinders fulcrumed on the felly, a plurality of rods having hooked ends connected to the hub so as to be capable of pivoting in relation thereto, said rods extending through said cylinders, and springs disposed in the cylinders so as to resiliently connect the rods and the cylinders.

2. In combination, a hub, a pair of flanges situated on the hub and provided with series of apertures, a felly, a plurality of cylinders fulcrumed on the felly, a plurality of rods having hooked ends passing through the apertures in the flanges of said hub so as to be fulcrumed in relation thereto, said rods extending through said cylinders and springs disposed in the cylinders so as to resiliently connect the rods and the cylinders.

3. A wheel comprising in combination, a hub, a felly, spokes connecting the hub to the felly, each spoke comprising a cylinder having its outer end closed and provided with an aperture, a removable apertured cap on its inner end, a rod extending through the cylinder and through the apertures in its closure and in the cap, said rod being provided with a threaded shank, a sleeve longitudinally adjustable on the rod, washers slidable on the sleeve within the cylinder, and springs mounted between said washers.

4. A wheel comprising in combination, a hub, a felly, spokes connecting the hub to the felly, each spoke comprising a cylinder having its outer end closed and provided with an aperture, a removable apertured cap on its inner end, a rod, extending through the cylinder and through the apertures in its closure and in the cap, said rod being provided with a threaded shank, a sleeve longitudinally adjustable on the rod, washers slidable on the sleeve within the cylinder, springs mounted between said washers, and nuts disposed on the threaded shank of the rod at the ends of the sleeve preventing movement thereof and preventing the washers from slipping off the ends thereof.

In testimony whereof I affix my signature in presence of two witnesses.

JOHN L. STOLTZ.

Witnesses:
　CHAS. F. KLINGLER,
　NORTON M. DEVONSHIRE.